US012482439B1

(12) United States Patent
Yang

(10) Patent No.: US 12,482,439 B1
(45) Date of Patent: Nov. 25, 2025

(54) DISPLAY DEVICE AND DISPLAY BRIGHTNESS ADJUSTMENT METHOD THEREOF

(71) Applicant: ASUSTeK COMPUTER INC., Taipei (TW)

(72) Inventor: Chih-Hsien Yang, Taipei (TW)

(73) Assignee: ASUSTeK COMPUTER INC., Taipei (TW)

( * ) Notice: Subject to any disclaimer, the term of this patent is extended or adjusted under 35 U.S.C. 154(b) by 0 days.

(21) Appl. No.: 19/019,458

(22) Filed: Jan. 14, 2025

(30) Foreign Application Priority Data

Dec. 4, 2024 (TW) ................................ 113146902

(51) Int. Cl.
*G09G 5/10* (2006.01)

(52) U.S. Cl.
CPC ....... *G09G 5/10* (2013.01); *G09G 2320/0233* (2013.01); *G09G 2320/0626* (2013.01); *G09G 2354/00* (2013.01); *G09G 2360/144* (2013.01)

(58) Field of Classification Search
CPC ............ G09G 5/10; G09G 2320/0233; G09G 2320/0626; G09G 2354/00; G09G 2360/14
See application file for complete search history.

(56) References Cited

U.S. PATENT DOCUMENTS

| | | | | |
|---|---|---|---|---|
| 11,107,440 | B2 * | 8/2021 | Aurongzeb | H04W 4/30 |
| 12,400,608 | B2 * | 8/2025 | Li | G09G 3/3406 |
| 2023/0363217 | A1 * | 11/2023 | Lee | G06F 3/044 |

FOREIGN PATENT DOCUMENTS

| | | |
|---|---|---|
| CN | 112201209 | 1/2021 |
| CN | 118506744 | 8/2024 |
| WO | 2024138399 | 7/2024 |

* cited by examiner

*Primary Examiner* — Rodney Amadiz
(74) *Attorney, Agent, or Firm* — JCIPRNET

(57) ABSTRACT

A display device and a display brightness adjustment method thereof are provided. Determine whether the display device is located indoors or outdoors based on a light sensing signal, and when it is determined that the display device is located outdoors, adjust a display brightness of the display device corresponding to an indoor brightness based on a formula, the formula includes a ratio of an outdoor display brightness adjustment range to an indoor display brightness adjustment range.

10 Claims, 2 Drawing Sheets

DISPLAY DEVICE AND DISPLAY BRIGHTNESS ADJUSTMENT METHOD THEREOF

CROSS-REFERENCE TO RELATED APPLICATION

This application claims the priority benefit of Taiwanese application Ser. No. 113146902, filed on Dec. 4, 2024. The entirety of the above-mentioned patent application is hereby incorporated by reference herein and made a part of this specification.

BACKGROUND

Technical Field

The disclosure relates to an electronic device, and particularly relates to a display device and a display brightness adjustment method thereof.

Related Art

Generally speaking, in daylight, the display brightness of a display needs to be 400-700 nits for good visibility, while in more direct or brighter daylight, at least 1000 nits are needed for good visibility. Electronic devices can usually control display brightness through a graphical user interface (GUI) displayed on the display, but under intense daylight irradiation, it may be difficult to see the graphical user interface clearly, making it difficult to adjust the display brightness. Although turning on the automatic brightness adjustment function of the electronic device may improve this problem, the automatic brightness adjustment of known technology still often has situations where the display brightness is insufficient, and there is considerable room for improvement.

SUMMARY

The disclosure provides a display device and its method for adjusting display brightness, which may effectively optimize the display brightness of the display device and improve the display quality of the display device.

The display device of the disclosure includes a light sensor, a display panel, and a control circuit. The light sensor senses a light characteristic of the environment light and generates a light sensing signal. The display panel has a display brightness, which includes indoor display brightness and outdoor display brightness, and the indoor display brightness has an indoor display brightness adjustment range, while the outdoor display brightness has an outdoor display brightness adjustment range. The control circuit is coupled to the light sensor and the display panel, and receives the light sensing signal. When the control circuit determines that the display device is located outdoors based on the light sensing signal, the control circuit adjusts the display brightness according to an indoor display brightness corresponding formula, wherein the formula includes a ratio of the outdoor display brightness adjustment range to the indoor display brightness adjustment range.

The disclosure also provides a method for adjusting display brightness of a display device, including the following steps: sensing a light characteristic of the environment light to generate a light sensing signal; receiving the light sensing signal and determining whether the display device is located indoors or outdoors based on the light sensing signal, wherein the display device has a display brightness, the display brightness includes indoor display brightness and outdoor display brightness, and the indoor display brightness has an indoor display brightness adjustment range, while the outdoor display brightness has an outdoor display brightness adjustment range; when it is determined that the display device is located outdoors based on the light sensing signal, adjusting the display brightness according to an indoor display brightness corresponding formula, wherein the formula includes a ratio of the outdoor display brightness adjustment range to the indoor display brightness adjustment range.

Based on the above, the embodiment of the disclosure determines whether the display device is located indoors or outdoors according to the light sensing signal. When it is determined that the display device is located outdoors, the display brightness of the display device is adjusted according to a formula corresponding to the indoor display brightness, wherein the formula includes a ratio of the outdoor display brightness adjustment range to the indoor display brightness adjustment range. This can effectively optimize the display brightness of the display device both indoors and outdoors, avoiding a situation where insufficient display brightness affects the viewing quality of the display device for the user.

DESCRIPTION OF THE EMBODIMENTS

Figure 1:
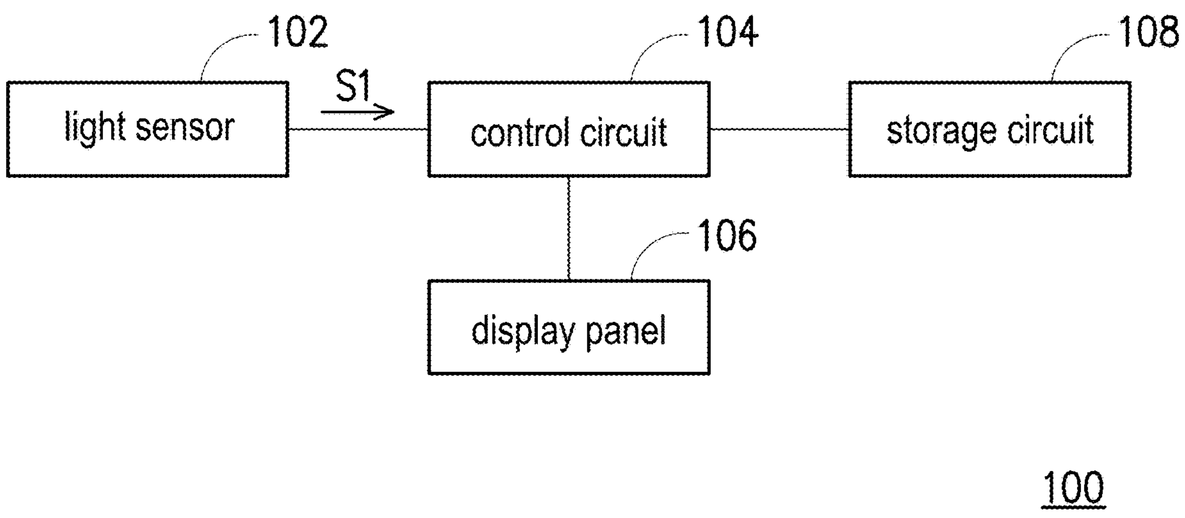
FIG. 1 is a schematic diagram of a display device according to an embodiment of the disclosure.

FIG. 1 is a schematic diagram of a display device according to an embodiment of the disclosure. Please refer to FIG. 1. The display device 100 includes a light sensor 102, a control circuit 104, a display panel 106, and a storage circuit 108. The control circuit 104 is coupled to the light sensor 102, the display panel 106, and the storage circuit 108. The display device 100 may be, for example, a mobile phone, a tablet computer, or other electronic devices that includes the display panel 106. The light sensor 102 may sense a light characteristic of environment light to generate a light sensing signal S1, wherein the light characteristic of the environment light may include at least one of light intensity or light frequency, but are not limited thereto. The light sensor 102 may be implemented as a photodiode, for example, but is not limited thereto. The display panel 106 displays image frames, such as displaying a graphical user interface. The display panel 106 may be, for example, a liquid crystal display panel or an organic light-emitting diode panel, but is not limited thereto. The storage circuit 108 stores display setting parameters of the display device 100, such as the display brightness of the display panel 106, but is not limited thereto.

Moreover, the control circuit 104 may determine whether the display device 100 is located indoors or outdoors according to the light sensing signal S1. For example, it may determine whether the display device 100 is located indoors or outdoors based on the light intensity or light wavelength of the environment light reflected by the light sensing signal S1. For instance, the control circuit 104 may determine whether the light intensity of the environment light is higher than a preset light intensity. When the light intensity is higher than the preset light intensity, it may determine that the display device 100 is located outdoors. In some embodiments, it may further determine that the display device 100 is located outdoors only when the light intensity of the environment light is higher than the preset light intensity and maintains above the preset light intensity for a preset time period, to increase the accuracy of the determination. As another example, the control circuit 104 may determine whether the light wave of the environment light is within a preset wavelength range. If the light wavelength of the environment light is within the preset wavelength range, it may determine that the display device 100 is located outdoors.

The control circuit 104 may respond to the display device 100 being located outdoors by adjusting the display brightness of the display panel 106 according to the indoor display brightness of the display panel 106, the minimum outdoor display brightness, and a formula, wherein the brightness formula is the ratio of the outdoor display brightness adjustment range to the indoor display brightness adjustment range. More specifically, the control circuit 104 may adjust the display brightness of the display panel 106 using the following equation (1), for example.

$$V2=V1\times[(B\max2-B\min2)/(B\max1-B\min1)]+B\min2 \quad (1)$$

Where V2 is the outdoor display brightness of the display panel 106, V1 is the indoor display brightness of the display panel, Bmax1 and Bmin1 are maximum and minimum values of the indoor display brightness adjustment range respectively, Bmax2 and Bmin2 are maximum and minimum values of the outdoor display brightness adjustment range respectively, and Bmin2 is greater than Bmin1. The brightness value of the indoor display brightness V1 may be set by the user according to their habit, for example. When the control circuit 104 determines that the display device 100 is located outdoors, the control circuit 104 may adjust the display brightness of the display panel 106 according to the above equation (1). In equation (1), the display brightness Bmin2 ensures the minimum display brightness of the display panel 106, avoiding the situation of insufficient display brightness. Multiplying the indoor display brightness V1 with the brightness formula ((Bmax2-Bmin2)/(Bmax1-Bmin1)) and then adding the display brightness Bmin2 further linearly adjust the outdoor display brightness V2 based on the display brightness that the user is accustomed to using indoors, thereby optimizing the outdoor display brightness V2.

In some embodiments, the control circuit 104 may adjust the value of Bmin2 according to the light intensity of the environment light. For example, when the light intensity of the outdoor environment light is greater, the value of Bmin2 may be increased, or both the values of Bmax2 and Bmin2 may be correspondingly increased.

Figure 2:
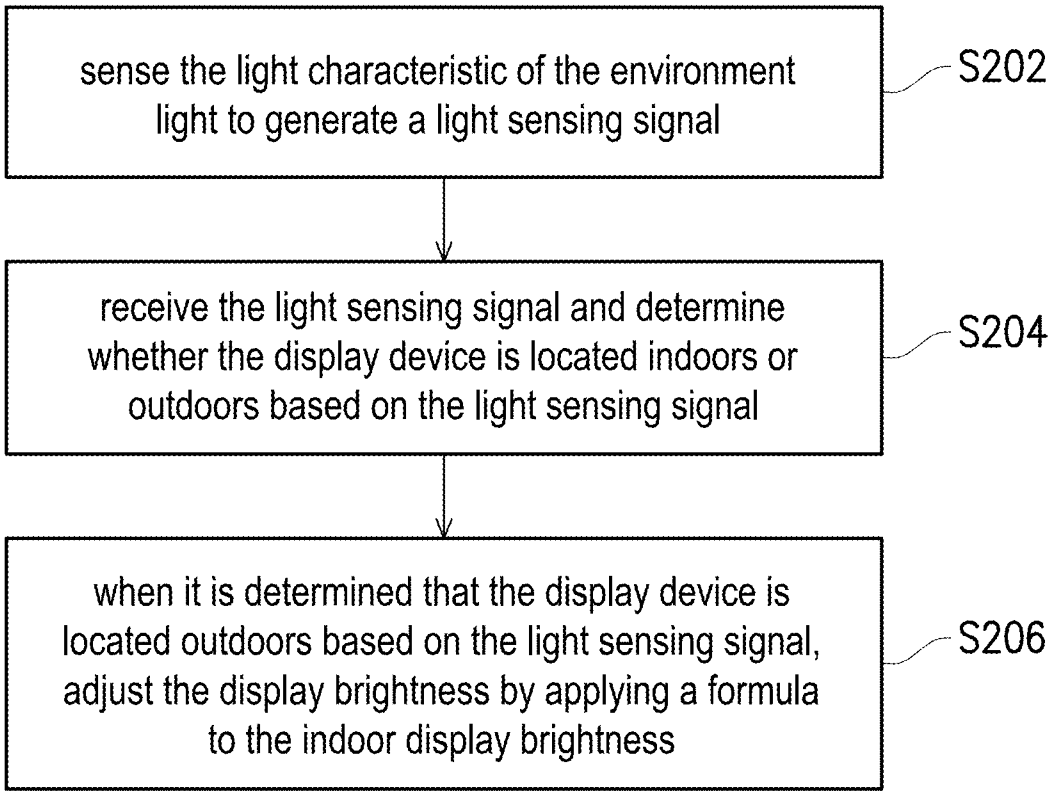
FIG. 2 is a flowchart of a method for adjusting display brightness of the display device according to an embodiment of the disclosure.

FIG. 2 is a flowchart of a display brightness adjustment method for a display device according to an embodiment of the disclosure, wherein the display device has a display brightness, the display brightness includes indoor display brightness and outdoor display brightness, and the indoor display brightness has an indoor display brightness adjustment range, and the outdoor display brightness has an outdoor display brightness adjustment range. Please refer to FIG. 2. As can be seen from the above embodiment, the display brightness adjustment method for the display device may include at least the following steps. First, sense the light characteristic of the environment light to generate a light sensing signal (step S202), wherein the light characteristic of the environment light may include at least one of intensity or light wavelength, but are not limited thereto. Next, receive the light sensing signal and determine whether the display device is located indoors or outdoors based on the light sensing signal (step S204). For example, it may be determined that the display device is located outdoors when the light intensity of the environment light reflected by the light sensing signal is higher than a preset light intensity and maintains above the preset light intensity for a preset time, or when the light wavelength of the environment light is within a preset wavelength range. Then, when it is determined that the display device is located outdoors based on the light sensing signal, adjust the display brightness by applying a formula to the indoor display brightness (step S206), wherein the formula includes the ratio of the outdoor display brightness adjustment range to the indoor display brightness adjustment range. More specifically, the way to adjust the display brightness of the display panel may be as shown in the above equation (1), which will not be repeated here.

In summary, the embodiments of the disclosure determine whether the display device is located indoors or outdoors based on the light sensing signal, and when it is determined that the display device is located outdoors, adjust the display brightness of the display device according to a formula corresponding to the indoor display brightness, wherein the formula includes the ratio of the outdoor display brightness adjustment range to the indoor display brightness adjustment range. This may effectively optimize the display brightness of the display device both indoors and outdoors, avoiding the situation where the viewing quality of the display device is affected due to insufficient display brightness for the user.

What is claimed is:

1. A display device, comprising:

a light sensor, sensing a light characteristic of an environment light to generate a light sensing signal;

a display panel, having a display brightness, the display brightness comprising an indoor display brightness and an outdoor display brightness, and the indoor display brightness having an indoor display brightness adjustment range, the outdoor display brightness having an outdoor display brightness adjustment range; and a control circuit, coupled to the light sensor and the display panel, and receiving the light sensing signal, when the control circuit determines the display device is located outdoors based on the light sensing signal, the control circuit adjusts the display brightness according to a formula corresponding to the indoor display brightness, wherein the formula comprises a ratio of the outdoor display brightness adjustment range to the indoor display brightness adjustment range.

2. The display device as claimed in claim 1, wherein the formula corresponding to the control circuit is:

$$V2=V1\times[(B\max2-B\min2)/(B\max1-B\min1)]+B\min2 \quad (1)$$

wherein V2 is the outdoor display brightness, V1 is the indoor display brightness, Bmax1 and Bmin1 are a maximum value and a minimum value of the indoor display brightness adjustment range respectively, Bmax2 and Bmin2 are the maximum value and minimum value of the outdoor display brightness adjustment range respectively, and Bmin2 is greater than Bmin1.

3. The display device as claimed in claim 2, wherein the control circuit adjusts a value of Bmin2 according to light intensity of the environment light, wherein the value of Bmin2 increases as the light intensity of the environment light increases.

4. The display device as claimed in claim 1, wherein the light characteristic of the environment light comprises at least one of light intensity or light wavelength.

5. The display device as claimed in claim 4, wherein when the light intensity of the environment light is higher than a preset light intensity and maintains higher than the preset light intensity for a preset time, or when the light wavelength of the environment light is within a preset wavelength range, the control circuit determines that the display device is located outdoors.

6. A display brightness adjustment method for a display device, comprising:

sensing a light characteristic of an environment light to generate a light sensing signal;

receiving the light sensing signal, and determining whether the display device is located indoors or outdoors based on the light sensing signal, the display device having a display brightness, the display brightness comprising an indoor display brightness and an outdoor display brightness, and the indoor display brightness having an indoor display brightness adjustment range, the outdoor display brightness having an outdoor display brightness adjustment range; and when determining the display device is located outdoors based on the light sensing signal, adjusting the display brightness according to a formula corresponding to the indoor display brightness, wherein the formula comprises a ratio of the outdoor display brightness adjustment range to the indoor display brightness adjustment range.

7. The display brightness adjustment method for a display device as claimed in claim 6, wherein the formula is:

$$V2=V1\times[(B\max2-B\min2)/(B\max1-B\min1)]+B\min2 \quad (1)$$

wherein V2 is the outdoor display brightness, V1 is the indoor display brightness, Bmax1 and Bmin1 are a maximum value and a minimum value of the indoor display brightness adjustment range respectively, Bmax2 and Bmin2 are the maximum value and minimum value of the outdoor display brightness adjustment range respectively, and Bmin2 is greater than Bmin1.

8. The display brightness adjustment method for a display device as claimed in claim 7, comprising:

adjusting a value of Bmin2 according to light intensity of the environment light, wherein the value of Bmin2 increases as the light intensity of the environment light increases.

9. The display brightness adjustment method for a display device as claimed in claim 6, wherein the light characteristic of the environment light comprises at least one of light intensity or light wavelength.

10. The display brightness adjustment method for a display device as claimed in claim 9, wherein when the light intensity of the environment light is higher than a preset light intensity and maintains higher than the preset light intensity for a preset time, or when the light wavelength of the environment light is within a preset wavelength range, determining that the display device is located outdoors.

* * * * *